(12) United States Patent
Matsuzaki et al.

(10) Patent No.: US 10,770,945 B2
(45) Date of Patent: Sep. 8, 2020

(54) ROTATING ELECTRICAL MACHINE COIL

(71) Applicants: KABUSHIKI KAISHA TOSHIBA, Minato-ku (JP); TOSHIBA ENERGY SYSTEMS & SOLUTIONS CORPORATION, Kawasaki-shi (JP)

(72) Inventors: Hidehito Matsuzaki, Yokohama (JP); Tetsushi Okamoto, Kawasaki (JP); Fumio Sawa, Tokyo (JP); Miki Nakamura, Kawasaki (JP); Atsushi Yamamoto, Tachikawa (JP); Yo Sasaki, Saitama (JP); Masafumi Fujita, Yokohama (JP); Yoshihiro Taniyama, Tokyo (JP); Takashi Harakawa, Yokohama (JP); Norio Takahashi, Yokohama (JP); Takaaki Hirose, Yokohama (JP); Hiroaki Ishizuka, Tokyo (JP)

(73) Assignees: KABUSHIKI KAISHA TOSHIBA, Minato-ku (JP); TOSHIBA ENERGY SYSTEMS & SOLUTIONS CORPORATION, Kawasaki-shi (JP)

( * ) Notice: Subject to any disclaimer, the term of this patent is extended or adjusted under 35 U.S.C. 154(b) by 190 days.

(21) Appl. No.: 15/862,676

(22) Filed: Jan. 5, 2018

(65) Prior Publication Data
US 2018/0198345 A1  Jul. 12, 2018

(30) Foreign Application Priority Data

Jan. 6, 2017 (JP) .................................. 2017-001209
Mar. 3, 2017 (JP) .................................. 2017-040611
Dec. 18, 2017 (JP) .................................. 2017-242170

(51) Int. Cl.
*H02K 3/40* (2006.01)
*H02K 3/12* (2006.01)
(Continued)

(52) U.S. Cl.
CPC .................. *H02K 3/40* (2013.01); *H02K 3/12* (2013.01); *H02K 3/505* (2013.01); *H02K 15/0062* (2013.01)

(58) Field of Classification Search
CPC ............ H02K 3/04; H02K 3/32; H02K 3/325; H02K 3/34; H02K 3/345; H02K 3/40; H02K 3/46; H02K 3/50
(Continued)

(56) References Cited

U.S. PATENT DOCUMENTS 4,321,497 A * 3/1982 Long ........................ H02K 3/12
310/198
6,865,796 B1 3/2005 Oohashi et al.
(Continued)

FOREIGN PATENT DOCUMENTS

CN 1768456 A 5/2006
CN 101179212 A 5/2008
(Continued)

*Primary Examiner* — Thomas Truong
(74) *Attorney, Agent, or Firm* — Oblon, McClelland, Maier & Neustadt, L.L.P.

(57) ABSTRACT

According to one embodiment, there is provided a rotating electrical machine coil with a conductor and an insulation layer that is provided around the conductor to cover the conductor, the rotating electrical machine coil including a linear part of the coil and a coil end that is separable from and electrically connectable to the linear part of the coil.

1 Claim, 13 Drawing Sheets

(51) Int. Cl.
*H02K 15/00* (2006.01)
*H02K 3/50* (2006.01)

(58) Field of Classification Search
USPC ............... 310/179, 180, 184, 196, 208, 260
See application file for complete search history.

(56) References Cited

U.S. PATENT DOCUMENTS

| | | | | |
|---|---|---|---|---|
| 2008/0106157 | A1* | 5/2008 | Higashimura | H01B 1/24 |
| | | | | 310/45 |
| 2011/0248585 | A1* | 10/2011 | Wang | H02K 3/12 |
| | | | | 310/71 |
| 2014/0077639 | A1* | 3/2014 | Kleber | H02K 15/0081 |
| | | | | 310/71 |
| 2015/0280503 | A1* | 10/2015 | Takahashi | H02K 3/12 |
| | | | | 310/201 |
| 2017/0025907 | A1* | 1/2017 | Iki | H02K 3/12 |
| 2017/0126095 | A1 | 5/2017 | Kondo et al. | |

FOREIGN PATENT DOCUMENTS

| | | | |
|---|---|---|---|
| CN | 203522113 U | 4/2014 | |
| CN | 104953729 A | 9/2015 | |
| JP | 2001-238385 | 8/2001 | |
| JP | 2013-55732 | 3/2013 | |
| JP | 5769659 | 8/2015 | |
| JP | 5881921 | 3/2016 | |
| WO | WO-9929024 A1 * | 6/1999 | ........... H01F 27/288 |
| WO | WO 2004/093257 A1 | 10/2004 | |

\* cited by examiner

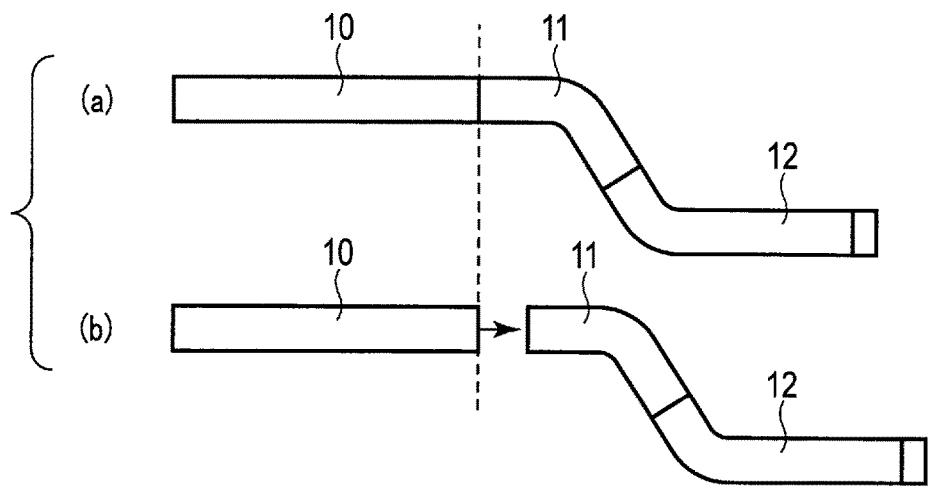
F I G. 1
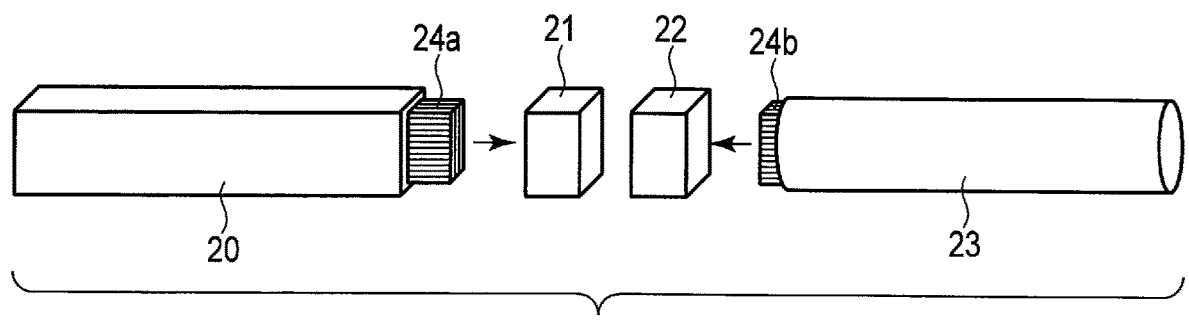
F I G. 2
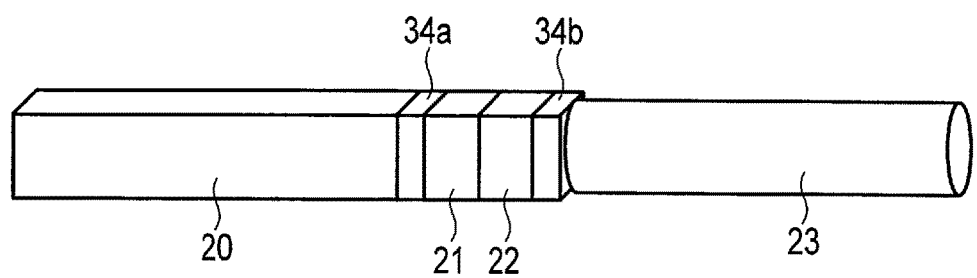
F I G. 3

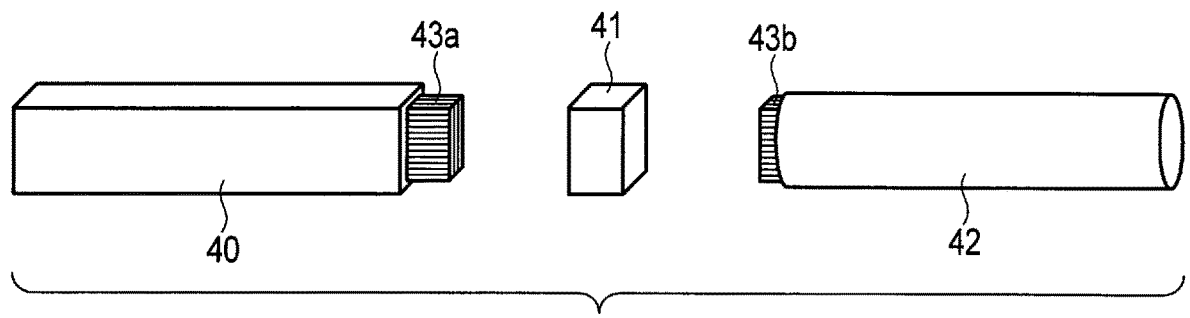
F I G. 4
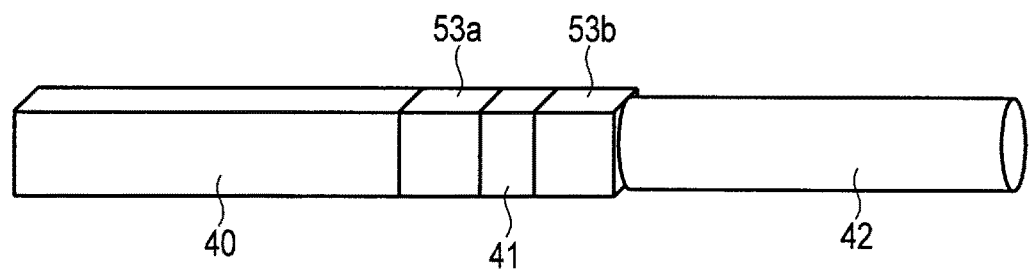
F I G. 5
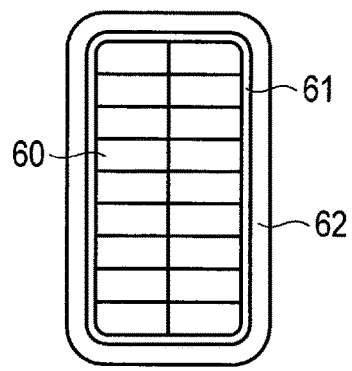
F I G. 6

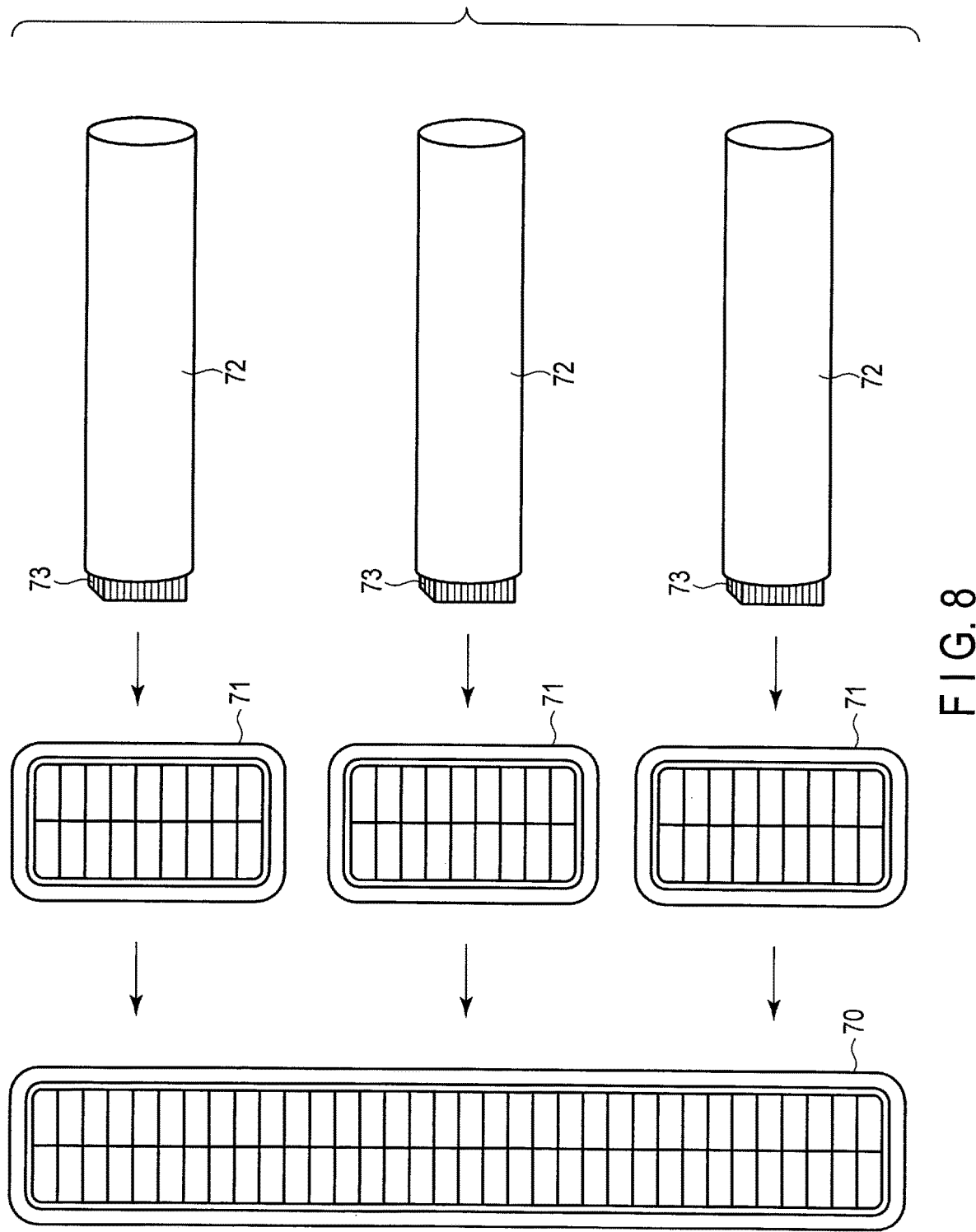
F I G. 8

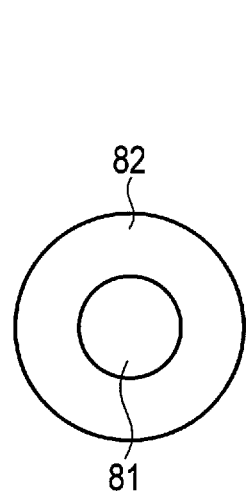 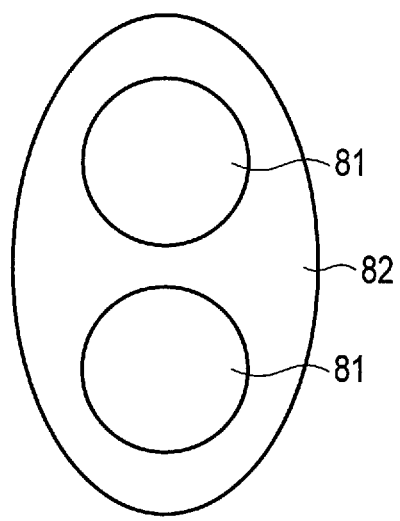 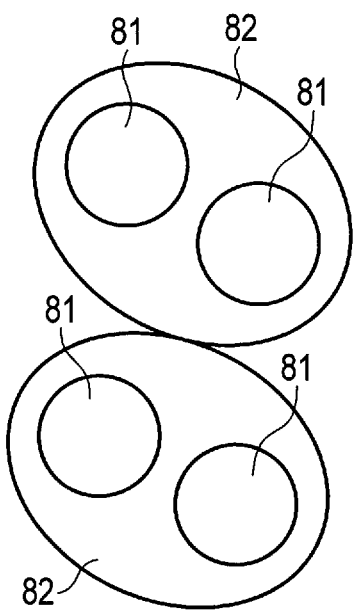
FIG. 9A   FIG. 9B   FIG. 9C
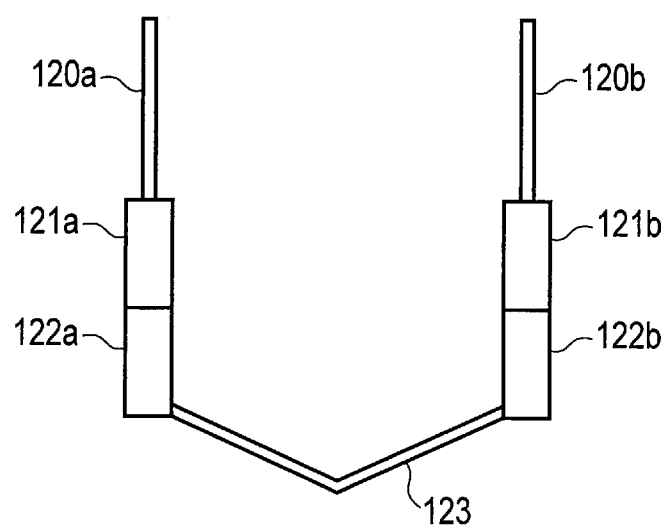
FIG. 10

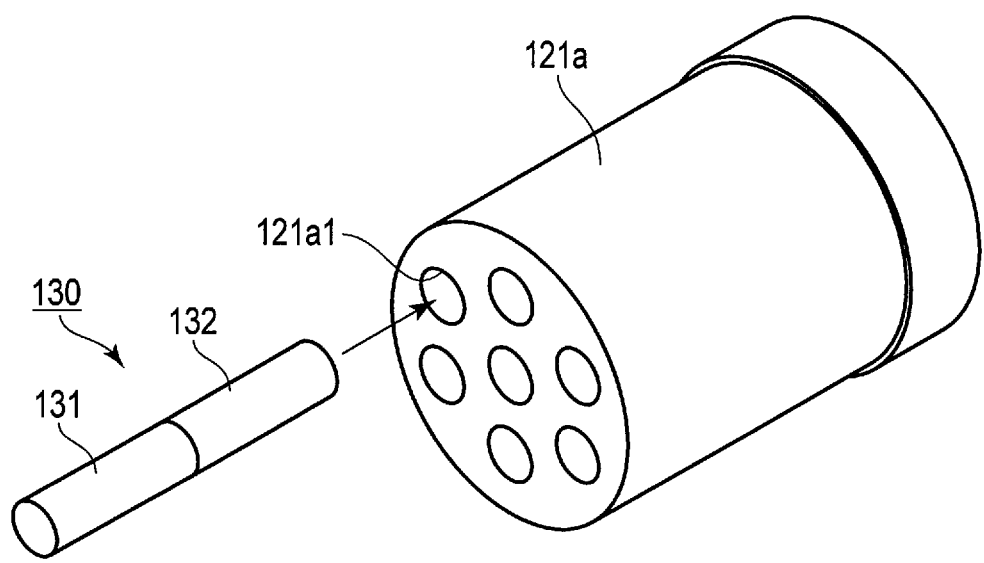
F I G. 11
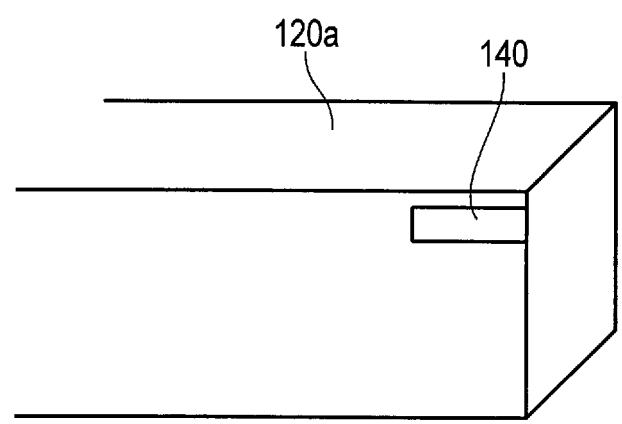
F I G. 12

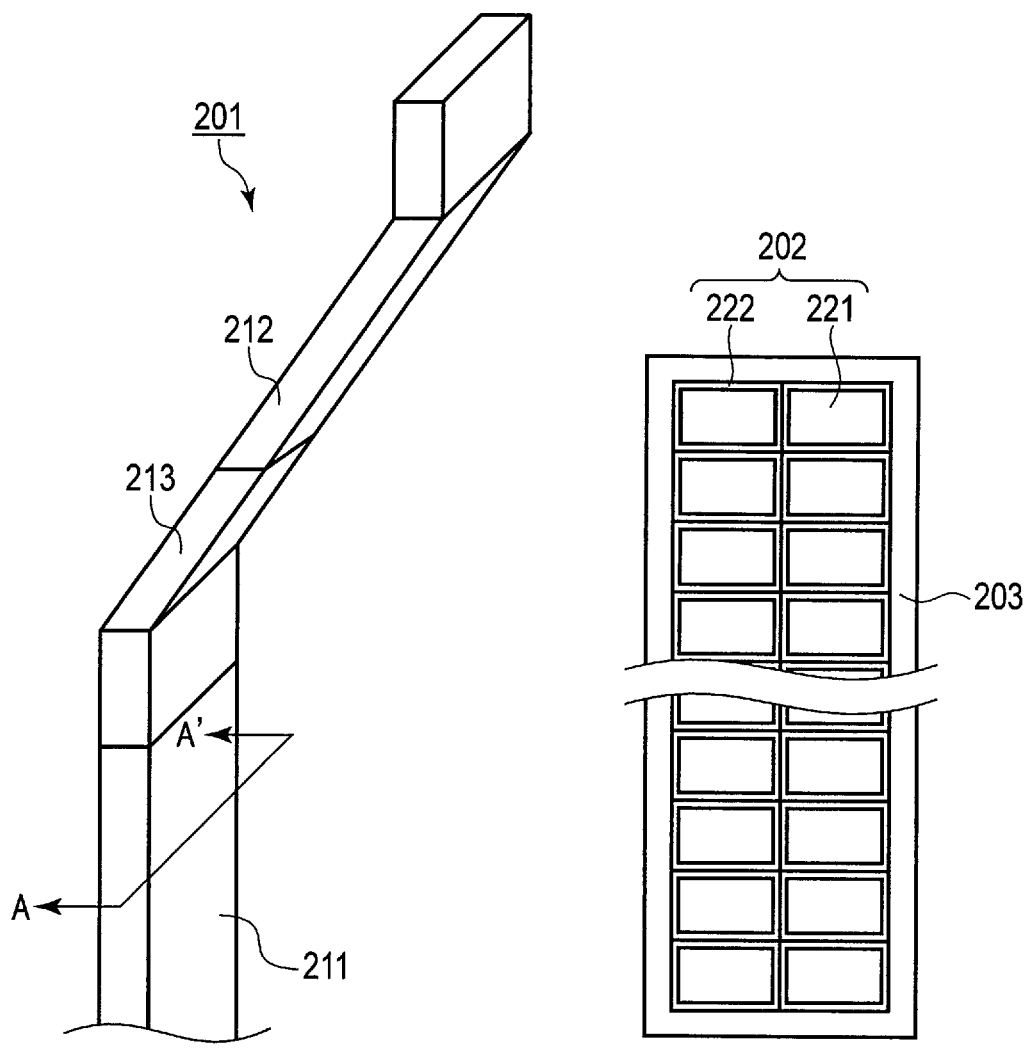
F I G. 13A  F I G. 13B

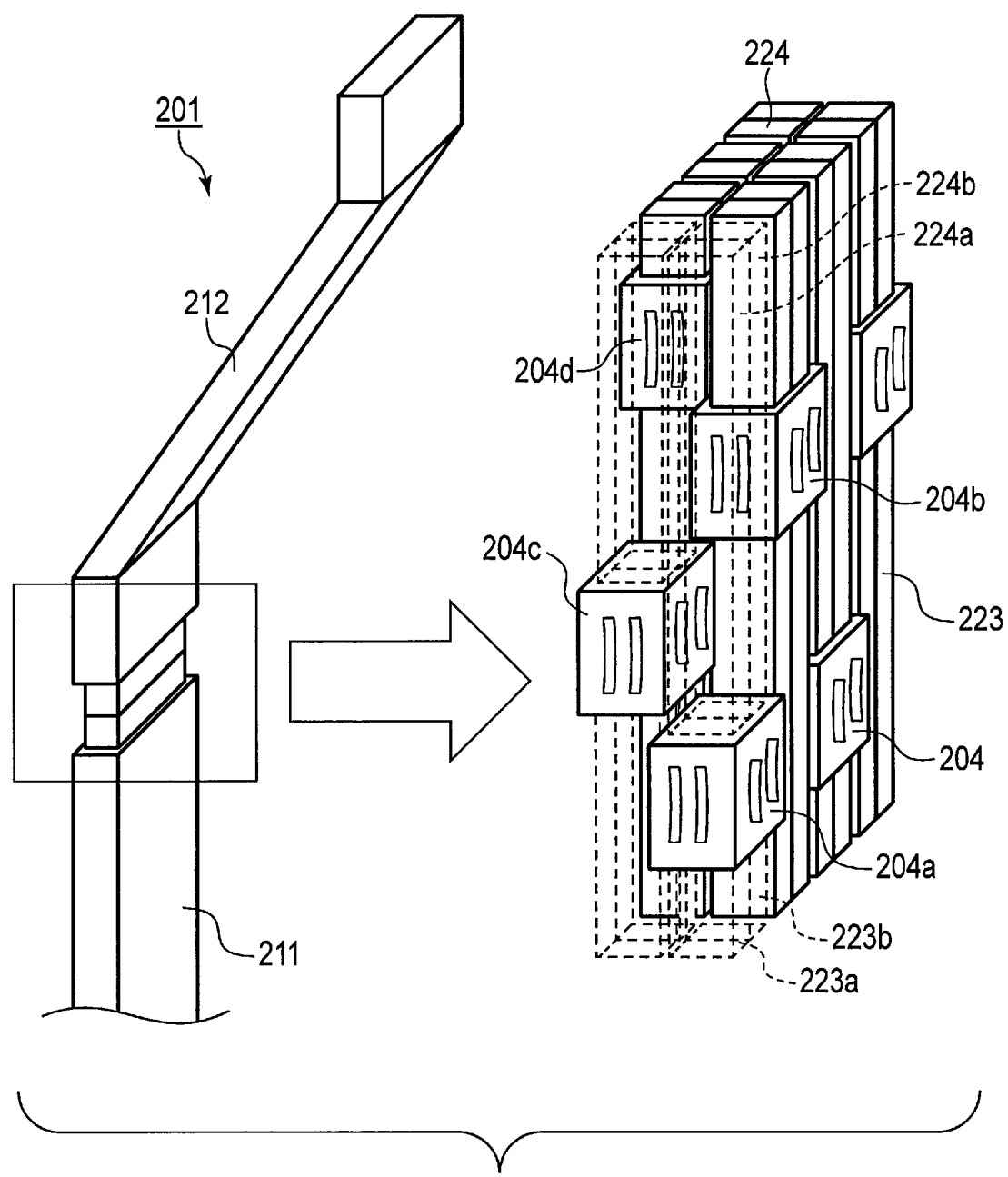
F I G. 16

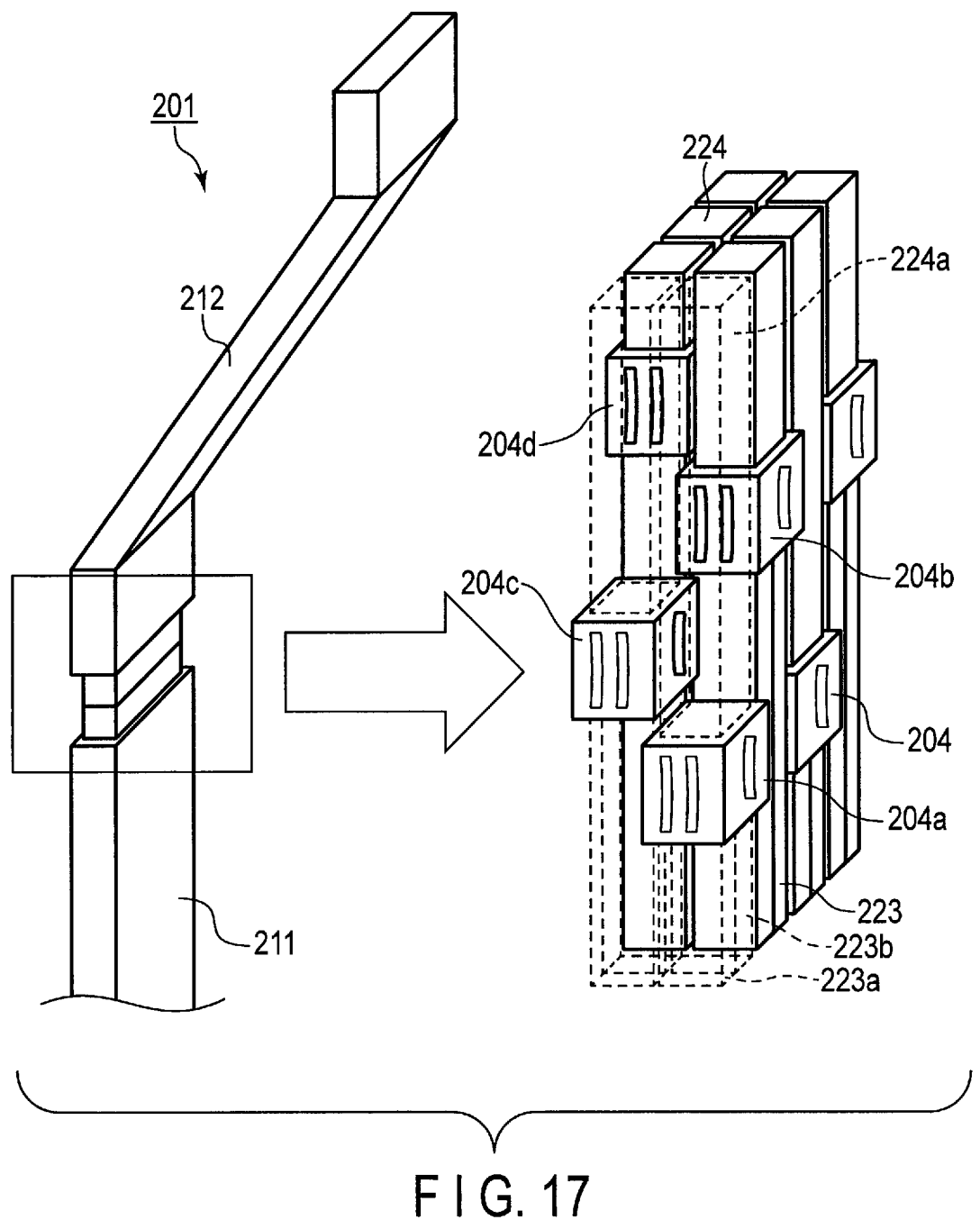
F I G. 17

ROTATING ELECTRICAL MACHINE COIL

CROSS-REFERENCE TO RELATED APPLICATIONS

This application is based upon and claims the benefit of priority from the prior Japanese Patent Application No. 2017-001209, filed Jan. 6, 2017, the prior Japanese Patent Application No. 2017-040611, filed Mar. 3, 2017, and the prior Japanese Patent Application No. 2017-242170, filed Dec. 18, 2017, the entire contents of all of which are incorporated herein by reference.

FIELD

Embodiments described herein relate generally to a rotating electrical machine coil.

BACKGROUND

A basic structure of a conventional stator coil is a unitary structure that includes a linear part of the coil that forms a straight line in an axial direction (longitudinal direction) parallel to a rotation axis center, a coil end (curved part), and a field alleviating layer. The coil end is wound around a stator core and protrudes from an axial end face, forming an involute shape. The stator core is formed of a layered body of metal plates, for example, with a slot radially formed (a groove extending in a radial direction) on a plurality of portions in a circumferential direction of an inner periphery. The coil end is electrically integral with the linear part of the coil via the field alleviating layer.

In a turbine generator or a water-wheel generator as a rotating electrical machine, a coil end has an involute curve, as described above, and the shape of the coil end differs for each product number of the electric generator. Therefore, it is necessary to produce a coil end having a complicated shape for each product number.

Also, in storing a coil in a slot, the shape of the coil end is complicated, as described above, and therefore it is necessary to perform the operation of picking up several coils, the so-called pick-up coil, when storing, in a slot, the final coil to be stored in the slot, which presents a challenge to the operation process.

BRIEF DESCRIPTION OF THE DRAWINGS

FIG. 1 is a schematic diagram of an example of a conventional stator coil;

FIG. 2 is a schematic diagram of an example of a configuration of a stator coil of a first embodiment before elements of the stator coil are connected to each other;

FIG. 3 is a schematic diagram of an example of a configuration of the stator coil of the first embodiment after elements of the stator coil are connected to each other;

FIG. 4 is a schematic diagram of an example of a configuration of the stator coil of the first embodiment before elements of the stator coil are connected to each other;

FIG. 5 is a schematic diagram of an example of a configuration of the stator coil of the first embodiment after elements of the stator coil are connected to each other;

FIG. 6 is a schematic diagram of a first example of a shape of a surface of one end of the stator coil of the first embodiment;

FIG. 8 is a schematic diagram of an example of a configuration of the first embodiment in which a surface of one end of a linear part of the coil and a coil end are connected to each other via a plurality of adapters;

FIG. 9A is a schematic diagram of an example of a shape of a surface of one end of a cable used as the coil end of the stator coil of the first embodiment;

FIG. 9B is a schematic diagram of an example of a shape of a surface of one end of a cable used as the coil end of the stator coil of the first embodiment;

FIG. 9C is a schematic diagram of an example of a shape of a surface of one end of a cable used as the coil end of the stator coil of the first embodiment;

FIG. 10 is a schematic diagram of an example of a configuration of a stator coil of a second embodiment after elements of the stator coil are connected to each other;

FIG. 11 is a schematic diagram of an example of an adapter of the stator coil of the second embodiment;

FIG. 12 is a schematic diagram of an example of a mark attached to the stator coil of the second embodiment;

FIG. 13A is a schematic diagram of a part of a coil for a rotating electrical machine;

FIG. 13B is a schematic diagram of a part of a coil for a rotating electrical machine;

FIG. 16 is a schematic diagram of an example of a joint between a linear part of a coil and a coil end of a fourth embodiment;

FIG. 17 is a schematic diagram of an example of a joint between a linear part of a coil and a coil end of a fifth embodiment;

DETAILED DESCRIPTION

Figure 7:
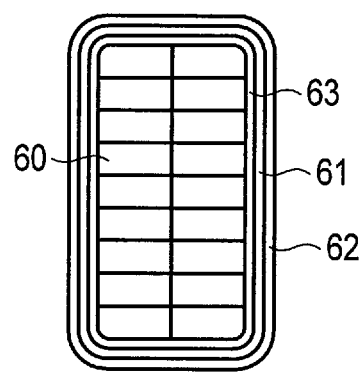
FIG. 7 is a schematic diagram of a second example of a shape of the surface of one end of the stator coil of the first embodiment.

In general, according to one embodiment, there is provided a rotating electrical machine coil with a conductor and an insulation layer that is provided around the conductor to cover the conductor, the rotating electrical machine coil including a linear part of the coil and a coil end that is separable from and electrically connectable to the linear part of the coil.

Hereinafter, embodiments will be described with reference to the drawings.

First Embodiment

The first embodiment will be described. The first embodiment and each of the embodiments that will be described later relate to a stator coil that can be stored in a slot on an outer periphery side of a core of a high-voltage rotating electrical machine, such as an induction motor or an electric generator, and can be fixed to the slot by a wedge.

Now, a conventional stator coil will be described to make the first embodiment easy to understand. FIG. 1 is a schematic diagram of an example of a conventional stator coil. FIG. 1 (a) is a schematic diagram of the conventional stator coil in a state where a coil end thereof is not separated. FIG. 1 (b) is a schematic diagram of the conventional stator coil in a state where the coil end thereof is separated.

As shown in FIG. 1, the conventional stator coil is configured in such a manner that a linear part 10 of the coil is integral with a coil end 12, and that a field alleviating layer 11 is disposed in a field convergence portion (curved part) in a midpoint of the stator coil. In this unitary stator coil, the field alleviating layer 11 or the coil end 12 is processed to form a curve.

FIG. 2 is a schematic diagram of an example of a configuration of a stator coil of the first embodiment before the elements of the stator coil are connected to each other. FIG. 3 is a schematic diagram of an example of a configuration of the stator coil of the first embodiment after the elements of the stator coil are connected to each other.

The stator coil of the first embodiment can be applied as a generator coil for a water-wheel generator or a turbine generator, for example, and a rated voltage of the stator coil is not particularly limited. As shown in FIG. 2, a linear part 20 of the stator coil of the first embodiment is configured in such a manner that a copper wire bundle 24a, which is a conductor, is exposed from one end (an end facing a coil end 23 side) of a member similar to the linear part 10 of the conventional stator coil. Before reaching an assembling operation of the stator coil, an end of the copper wire bundle 24a is electrically connectable to one end (an end facing the linear part 20 of the coil) of a first adapter 21 that is a connection member having electrical conductivity. Namely, in the first embodiment, the stator coil has a structure in which the coil end 23 is separable from and electrically connectable to the linear part 20 of the coil.

Also, the coil end 23 of the stator coil of the first embodiment is configured in such a manner that a copper wire bundle 24b is exposed from one end (an end facing the linear part 20 of the coil) of the coil end 23. Before reaching an assembling operation of the stator coil, an end of the copper wire bundle 24b is electrically connectable to one end (an end facing the coil end 23 side) of a second adapter 22 having electrical conductivity.

The method of connecting the copper wire bundle 24a exposed from one end of the linear part 20 of the coil and one end of the first adapter 21, and the method of connecting the copper wire bundle 24b exposed from one end of the coil end 23 and one end of the second adapter 22 use brazing and soldering (brazing, soldering, contact conduction heating), fusion welding, pressure welding, and the like. The connection method is not particularly limited.

The method of electrically connecting the other end of the first adapter 21 and the other end of the second adapter 22 (which are sometimes simply referred to collectively as an adapter) may use a socket (female terminal), for example.

The socket, for example, has a heatproof temperature of 150° C., a rated energizing current value of 46 A, and a contact resistance of 180 to 200 μΩ.

Also, the first adapter 21 and the second adapter 22 can be connected to each other in a detachable manner. This way of connection may adopt a configuration in which a spring (spring connector) that is plated with gold, silver, or the like to improve conductivity is included in a socket of one of the adapters, and when a male terminal of the other adapter is inserted into the socket, the spring is pressed at the terminal, so that the adapters electrically contact each other. Gold plating and silver plating are shown as typical examples of the plating, but the plating is not limited thereto.

It is possible to electrically connect the linear part 20 of the coil and the coil end 23 by electrically connecting the other end of the first adapter 21 and the other end of the second adapter 22 as an assembling operation of the stator coil at an assembly site, for example.

A field alleviating layer 34a for alleviating field convergence may be provided at a perimeter of the copper wire bundle 24a exposed from one end of the linear part 20 of the coil (a perimeter of a connection portion between the linear part 20 of the coil and the first adapter 21), as shown in FIG. 3. Likewise, a field alleviating layer 34b may be provided at a perimeter of the copper wire bundle 24b exposed from one end of the coil end 23 (a perimeter of a connection portion between the coil end 23 and the second adapter 22).

A material of the field alleviating layer is preferably a material having non-linear resistivity.

Examples of the material having non-linear resistivity include a paint and a cast resin. The paint and cast resin contain particles having non-linear resistivity.

Examples of the particles having non-linear resistivity include a micro-varistor, ZnO (zinc oxide), and SiC (silicon carbide). It is possible to form a field alleviating layer having non-linear resistivity by containing these particles in epoxy resin, for example. These particles may comprise a single kind of particle or a combination of two or more kinds of particles.

FIG. 4 is a schematic diagram of an example of a configuration of the stator coil of the first embodiment before the elements of the stator coil are connected to each other. FIG. 5 is a schematic diagram of an example of a configuration of the stator coil of the first embodiment after the elements of the stator coil are connected to each other.

In the examples shown in FIGS. 2 and 3, a combination of the first adapter 21 and the second adapter 22 is used. By contrast, it is also possible to use only one adapter 41 having electrical conductivity as an adapter for electrically connecting a linear part 40 of the coil and a coil end 42, as shown in FIGS. 4 and 5.

In this case, the linear part 40 of the coil is structured so that a copper wire bundle 43a is exposed from one end (an end facing the coil end 42 side) of a member similar to the conventional linear part 10 of the coil. An end of the copper wire bundle 43a can be electrically connected to one end (an end facing the linear part 40 of the coil) of the adapter 41.

Also, the coil end 42 is structured so that a copper wire bundle 43b is exposed from one end (an end facing the linear part 40 of the coil) of the coil end 42. An end of the copper wire bundle 43b can be electrically connected to the other end (an end facing the coil end 42) of the adapter 41.

Namely, the linear part 40 of the coil is configured so that the linear part 40 of the coil and the coil end 42 can be electrically connected to each other via one adapter 41.

A field alleviating layer 53a for alleviating field convergence may be provided at a perimeter of the copper wire bundle 43a exposed from one end of the linear part 40 of the coil (a perimeter of a connection portion between the linear part 40 of the coil and the adapter 41), as shown in FIG. 5. Likewise, a field alleviating layer 53b may be provided at a perimeter of the copper wire bundle 43b exposed from one end of the coil end 42 (a perimeter of a connection portion between the coil end 42 and the adapter 41).

Next, a method of manufacturing the stator coil of the first embodiment will be described.

FIG. 6 is a schematic diagram of a first example of a shape of a surface of one end of the linear part of the coil of the first embodiment.

As shown in FIG. 6, the linear part of the stator coil is configured to layer an inner corona shield 61 having semi-conductivity on a perimeter of a certain amount of fixed copper wire (conductor) 60. In this configuration of the linear part of the coil, a main insulation layer 62 is wound around the inner corona shield 61 by a taping machine, for example, and the whole body is hardened by heating.

In a method of manufacturing the copper wire 60, a conducting wire made of copper which is to be a conductor is used, the wire is cut into a predetermined length, for example, and thereafter an insulating coating on both ends is removed. Then, a predetermined number of conducting wires are bundled, and a coil is formed by heat pressing through the step of Roebel transposition, and molded into an involute shape, to be fixed. Thereby, the copper wire 60 of the linear part of the coil is produced.

The inner corona shield 61 may be any material as long as it is a low-resistance material, and may be a silicone tape, polyester non-woven fabric tape, or the like.

FIG. 7 is a schematic diagram of a second example of a shape of a surface of one end of the linear part of the coil of the first embodiment.

As shown in FIG. 7, the linear part of the stator coil may be configured to layer a heat stress alleviating layer (heat stress alleviating material) 63 and the inner corona shield 61 on a perimeter of the copper wire 60 in the mentioned order, then wind the main insulation layer 62 around the heat stress alleviating layer 63, and harden the whole body by heating. This heat stress alleviating layer 63 may be arranged between the copper wire 60 and the inner corona shield 61.

Examples of the heat stress alleviating material include a sheet-shaped material, a tape-shaped material, and a paint-form material (coating material). Arranging the heat stress alleviating layer in this manner can prevent detachment of the materials between which the heat stress alleviating layer is disposed.

Also, it is possible to electrically connect an end of the copper wire bundle 24a exposed from one end of the linear part 20 of the coil with one end of the first adapter 21, as shown in FIGS. 2 and 3, for example. It is possible to electrically connect an end of the copper wire bundle 24b exposed from one end of the coil end 23 with one end of the second adapter 22. It is then possible to electrically connect the other end of the first adapter 21 and the other end of the second adapter 22.

Lastly, it is possible to provide the field alleviating layer 34a around the copper wire bundle 24a exposed from one end of the linear part 20 of the coil, and provide the field alleviating layer 34b around the copper wire bundle 24b exposed from one end of the coil end 23.

In this manner, the stator coil of the first embodiment can be manufactured.

FIG. 8 is a schematic diagram of an example of a configuration of the first embodiment in which the surface of one end of the linear part of the coil and the coil end are connected to each other via a plurality of adapters.

As shown in FIG. 8, it is possible to electrically connect a surface of one end of one linear part 70 of the coil (a copper wire bundle that is exposed (not shown)) with one end of a plurality of adapters 71. It is also possible to electrically connect flexible cables used as a plurality of coil ends 72 with the other end of the plurality of adapters 71 having electrical conductivity on a one-to-one basis.

Specifically, at first, one end of the plurality of adapters 71 is aligned and electrically connected to the surface of one end of one linear part 70 of the coil. Then, copper wire bundles 73 exposed from one end of the plurality of coil ends 72 are aligned, and each of the copper wire bundles 73 is electrically connected to the other end of each adapter 71 corresponding thereto on a one-to-one basis. Thereby, one linear part 70 of the coil and the plurality of coil ends 72 can be electrically connected to each other.

With the configuration of electrically connecting one linear part 70 of the coil and the plurality of coil ends 72, as described above, the individual coil end 72 can be downsized. This makes it easy to make the coil end.

FIGS. 9A, 9B and 9C are schematic diagram of an example of a cross-sectional shape of a cable used as the coil end 23, 42, or 72 of the stator coil of the first embodiment.

The cable used as the coil end can be a flexible cable having high heat resistance and high voltage resistance, such as a CV cable (cross-linked polyethylene insulated vinyl sheath cable).

As shown in FIG. 9A, the CV cable has an insulation coating 82 made of cross-linked polyethylene on an outer periphery of a conductor 81.

FIG. 9B shows an example of a cross-section of a duplex CV cable. FIG. 9C shows an example of a cross-section of the duplex CV cables stacked in two tiers.

Using the flexible cable having high heat resistance and high voltage resistance as the coil end, as described above, makes it easy to manufacture the coil end of the stator coil.

In the present embodiment, the copper wire is exposed, as the linear part 20, 40, or 70 of the stator coil, from one end of the linear part of the coil similar to that of the conventional stator coil.

A flexible CV cable or the like is used for the coil end.

Next, the adapter 21, 22, 41, or 71 is electrically connected to each of the linear part of the coil and the coil end, and the adapters are electrically connected to each other at an assembly site.

Lastly, the field alleviating layer is provided around the connection portion between the linear part of the coil and the adapter and around the connection portion between the coil end and the adapter.

In the present embodiment, manufacturing the stator coil as described above makes it unnecessary to produce a coil end having a complicated shape for each product number. Therefore, the process of manufacturing the stator coil can be reduced to a large extent.

Also, the flexibility of the shape of the coil end is increased by using a flexible CV cable for the coil end.

Furthermore, with the above-described configuration, anoperation as the so-called pick-up coil becomes unnecessary, and manufacturing processing can be greatly improved.

Second Embodiment

Next, the second embodiment will be described. In the second embodiment, descriptions of parts similar to those of the first embodiment are omitted.

FIG. 10 is a schematic diagram of an example of a configuration of the stator coil of the second embodiment after the elements of the stator coil are connected to each other.

In the second embodiment, the stator coil has a structure in which a flexible member (e.g., flexible formed structure) 123 as a coil end is separable from and electrically connectable to a linear part 120a of the coil, as shown in FIG. 10.

In the second embodiment, the linear part 120a of the coil and a linear part 120b of the coil in pairs, which are stored in different slots not shown, and the longitudinal directions of which are substantially parallel to each other, are electrically connected to each other via various adapters and a coil end.

Specifically, the linear part 120a of the coil, a first adapter 121a, a second adapter 122a, the flexible member 123, a second adapter 122b, a first adapter 121b, and the linear part 120b of the coil are electrically connected to each other in the mentioned order in the second embodiment. In this embodiment, the flexible member is a member having electrical conductivity as a coil end. The flexible member is also a member having flexibility to such an extent that it can be bent, for example, by human force, namely, a member that is bendable by elastic deformation.

The connection of each element is described. One end of the linear part 120a of the coil and one end of the first adapter 121a are electrically connected to each other in a manner similar to the connection between one end of the linear part 20 of the coil and the first adapter 21 of the first embodiment. The same holds true of the connection between one end of the linear part 120b of the coil and one end of the first adapter 121b.

Also, one end of the second adapter 122a and one end of the flexible member 123 are electrically connected to each other in a manner similar to the connection between the second adapter 22 and the coil end 23 of the first embodiment. The same holds true of the connection between one end of the second adapter 122b and the other end of the flexible member 123.

Namely, in the second embodiment, the flexible member 123 having electrical conductivity as a coil end is provided so as to straddle the linear part 120a side and the linear part 120b side.

On the linear part 120a side, the other end of the first adapter 121a and the other end of the second adapter 122a are electrically connected to each other as an assembling operation of the stator coil at an assembly site, for example. Thereby, the linear part 120a of the coil and the flexible member 123 as a coil end can be electrically connected to each other.

Likewise, on the linear part 120b side, the other end of the first adapter 121b and the other end of the second adapter 122b are electrically connected to each other as the assembling operation mentioned above. Thereby, the linear part 120b of the coil and the flexible member 123 as a coil end can be electrically connected to each other.

For example, a member made of a pin and a socket into which the pin is insertable (male-female terminal) can be used in electrically attaching and detaching the other end of the first adapter 121a and the other end of the second adapter 122a (which are sometimes simply referred to collectively as an adapter). The same holds true of the connection between the first adapter 121b and the second adapter 122b.

The pin and the socket, for example, have a heatproof temperature of 150° C., a rated energizing current value of 46 A, and a contact resistance of 180 to 200µΩ.

In connecting the socket and the pin in a detachable manner, a silver-plated spring (spring connector) is included in the socket, and when the pin is inserted into the socket, the spring is pressed at the pin, so that the socket and the pin can electrically contact each other.

FIG. 11 is a schematic diagram of an example of the adapter of the stator coil of the second embodiment.

In the example shown in FIG. 11, a half of a member 130 seen from one end along the longitudinal direction thereof can be inserted into one of a plurality of voids 121a1 provided on a surface of one end of the first adapter 121a. Also, in the example shown in FIG. 11, a half of the member 130 seen from the other end along the longitudinal direction thereof can be inserted into a void provided on a surface of one end of the second adapter 122a mentioned above, for example. The member 130 is made of a pin 131 and a socket 132 into which the pin 131 can be inserted. A plurality of voids may be formed on a surface of one end of the adapter, as shown in FIG. 11, so that the member 130 is inserted into each of these voids.

In this manner, the adapters can be electrically connected to each other. The same holds true of the electrical connection between the first adapter 121b and the second adapter 122b and the electrical connection between the first adapter 21 and the second adapter 22 described in the first embodiment.

In the example shown in FIG. 11, a surface of one end of the adapter is circular, but it may have an angular shape, for example.

A field alleviating layer can be provided to the first adapters 121a and 121b and the second adapters 122a and 122b so as to wrap an outer surface of these adapters. In this manner, the function of the field alleviating layer can be added to the adapters.

Next, a method of manufacturing the stator coil of the second embodiment will be described.

FIG. 12 is a schematic diagram of an example of a mark attached to the stator coil of the second embodiment.

The operation of electrically connecting the linear part of the coil (e.g., linear part 120a of the coil), the first adapter (e.g. first adapter 121a), the second adapter (e.g., second adapter 122a), and the coil end (e.g., flexible member 123) in the manufacture of the stator coil can be performed by an automatic control device (e.g., a device for assembling a stator coil that is automatically controlled by a computer) not shown in the drawings.

For this connection, when making the linear part 120a of the coil, a tape or marker of a mark 140 (which is rectangular and white, for example) indicating an alignment place for the electrical connection is adhered or applied, in advance, near the portion of the linear part 120a of the coil connected to the first adapter (e.g., first adapter 121a), as shown in FIG. 12. The same applies to the vicinity of one end and the other end of the first adapter, one end and the other end of the second adapter (e.g., second adapter 122a), and the portion of the coil end (e.g., flexible member 123) connected to the second adapter.

An automatic control device recognizes the above mark, and aligns the linear part of the coil, the first adapter, the second adapter, and the coil end by automatic control based on the recognized place. The automatic control device electrically connects the linear part of the coil, the first adapter, the second adapter, and the coil end.

In the second embodiment, the copper wire is exposed, as the linear part of the stator coil, from one end of the linear part of the coil similar to that of the conventional stator coil, as described in the first embodiment. Unlike the first embodiment, the coil end uses a flexible member.

The adapters are electrically connected to each of the linear part of the coil and the coil end (flexible member), and the adapters are joined at an assembly site.

Next, the field alleviating layer is provided around the connection portion between the linear part of the coil and the adapter and around the connection portion between the coil end and the adapter.

Lastly, the field alleviating layer is provided on an outer surface of the adapter.

In the second embodiment, with the above-described configuration, it is unnecessary to produce a coil end having a complicated shape for each product number, as also described in the first embodiment. Therefore, the process of manufacturing the stator coil can be reduced to a large extent.

Also, a flexible member is used for the coil end. Thereby, the flexibility of the shape of the coil end increases, as compared to the first embodiment.

Furthermore, with the above-described configuration, an operation as the so-called pick-up coil becomes unnecessary, as also described in the first embodiment. Thereby, manufacturing processing can be greatly improved.

In addition, the linear part of the coil, the first adapter, the second adapter, and the coil end are electrically connected by automatic control. Thereby, the process of assembling the stator coil can be reduced, as compared to manually connecting the elements.

Third Embodiment

Next, the third embodiment will be described.

FIGS. 13A and 13B are schematic diagram of a part of a coil for a rotating electrical machine. FIG. 13A is a schematic diagram showing a vicinity of a boundary between a linear part 211 and a coil end 212 of a coil 201. FIG. 13B is a cross-sectional view taken in the direction of the arrow along the A-A' surface of the coil shown in FIG. 12.

In the example shown in FIG. 13A, the linear part 211 of the coil 201 is integral with the coil end 212 of the coil 201, and a field alleviating layer 213 is provided in a field convergence portion (curved part) being a boundary between the linear part 211 of the coil and the coil end 212. In this coil 201, the coil end 212 or the field alleviating layer 213 is processed to form a curve. In FIG. 13A, however, they are shown in a linear shape.

In the example shown in FIG. 13B, the coil 201 is formed by bundling wires 202 made of a conductor 221 and an insulator 222 provided around the conductor 221. A main insulation layer 203 is provided around a wire bundle formed by bundling the wires 202.

To make it easy to perform the above operation of making and storing the coil, it is possible to adopt a method in which, for example, manufacture the linear part 211 of the coil and the coil end 212 separately and join the wire of the linear part 211 of the coil and the wire of the coil end 212 by pressure bonding or welding at the time of assembling the coil.

Figure 14:
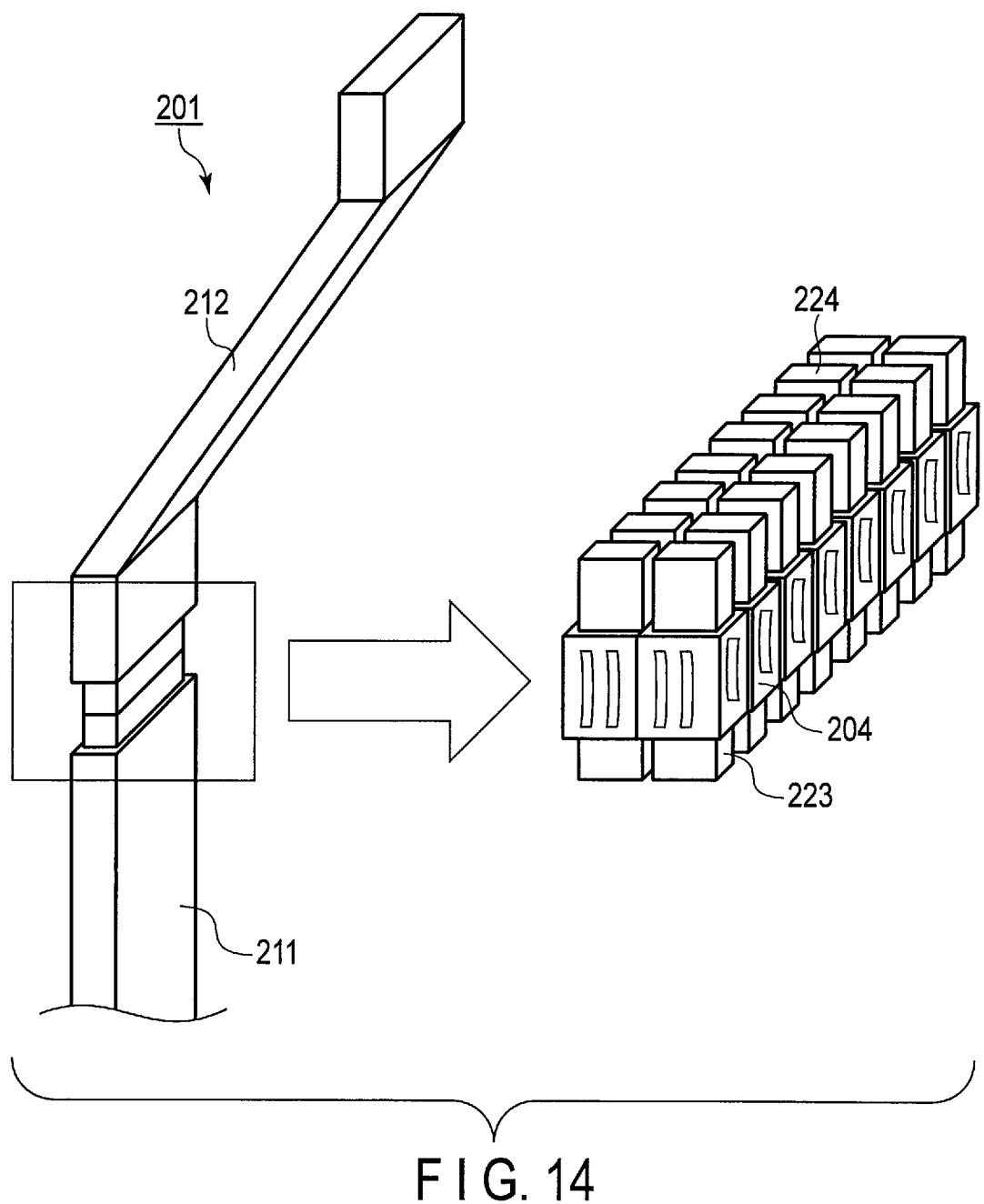
FIG. 14 is a schematic diagram of a first example of a joint between a linear part of a coil and a coil end of a third embodiment.

FIG. 14 is a schematic diagram of a first example of the joint between the linear part of the coil and the coil end of the third embodiment. FIG. 14 schematically illustrates an example of a junction 204 formed by separately making the linear part 211 of the coil constituted by wires 223 in two lines and eight tiers and the coil end 212 similarly constituted by wires 224 in two lines and eight tiers, and thereafter electrically joining each tier and each line of the wires of the linear part 211 of the coil with each tier and each line of the wires of the coil end 212, respectively.

An insulation treatment is performed around the junction 204 after joining the linear part 211 of the coil and the coil end 212 by the junction 204, but a diagram thereof is omitted for ease of comprehension. In the example shown in FIG. 14, the wires of the coil are configured in two lines and eight tiers, but the configuration of the wires is not limited thereto as long as a plurality of wires are aligned.

The wires 223 of the linear part 211 of the coil and the wires 224 of the coil end 212 face each other, and are electrically joined by the junction 204 at the same position in the longitudinal direction of the coil 201 (hereinafter sometimes simply called a longitudinal direction). These joined wires are electrically connected to each other. The number of wires 223 of the linear part 211 of the coil and the number of wires 224 of the coil end 212 that are joined by the same junction 204 are both one.

As a method of joining the wires 223 and the wires 224, brazing and soldering (brazing, soldering, contact conduction heating), fusion welding, pressure welding, and the like can be employed. Usually, a wire insulator is removed from a portion of a wire near a joining position; and this portion including a junction is insulated after wires are joined together.

In the joining area by the above-described joining method, a joining member is provided around the wires, and a main insulation layer is provided so as to surround the joining member. As such, the junction 204 between the linear part 211 of the coil and the coil end 212 swells, as compared to a part other than the area where the linear part 211 of the coil and the coil end 212 are joined. Because of this, the coil does not fall into a predetermined size, and a gap between adjacent coils narrows. Therefore, an electrical field between adjacent coils increases.

Accordingly, in the third embodiment, a coil for a rotating electrical machine that can inhibit the swelling of the junction 204 between the linear part 211 of the coil and the coil end 212 is described.

Figure 15:
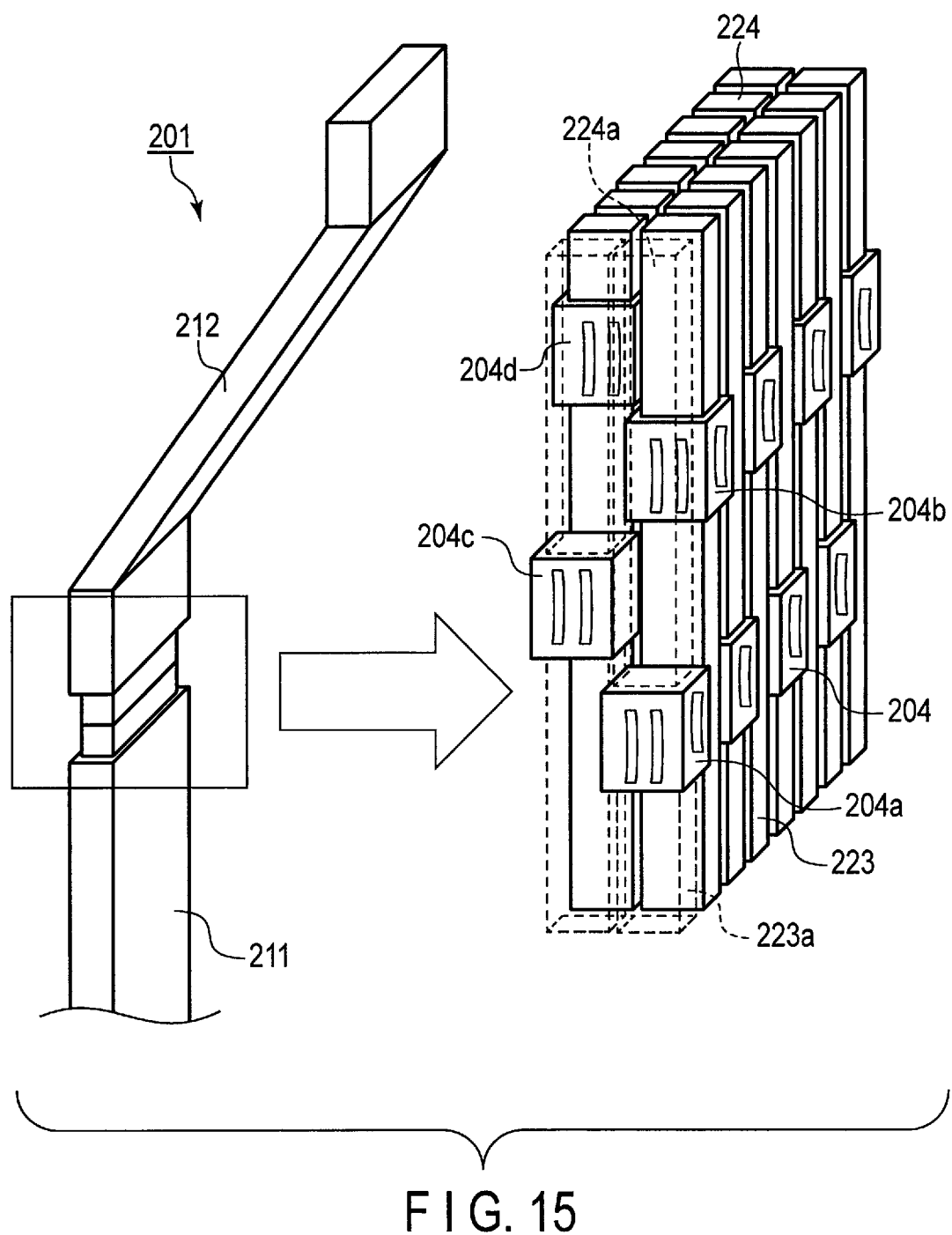
FIG. 15 is a schematic diagram of a second example of a joint between the linear part of the coil and the coil end of the third embodiment.

FIG. 15 is a schematic diagram of a second example of the joint between the linear part 211 of the coil and the coil end 212 of the third embodiment. A description of the parts of the configuration shown in FIG. 15 that overlap those of the configuration shown in FIGS. 13A, 13B and 14 is omitted.

FIG. 15 schematically illustrates a configuration in which the linear part 211 of the coil and the coil end 212 are electrically joined by the junction 204 after separately forming the linear part 211 of the coil constituted by the wires 223 in two lines and eight tiers, and the coil end 212 constituted by the wires 224 in two lines and eight tiers.

In the third embodiment, the wires 224 of the coil end 212 are joined with the wires 223 of the linear part 211 of the coil by the junction 204. These joined wires are electrically connected to each other. The number of wires 223 of the linear part 211 of the coil and the number of wires 224 of the coil end 212 that are electrically joined by the same junction 204 are both one.

In the example shown in FIG. 15, the junction 204 includes a junction 204a between a wire 223a in the first line and the first tier of the wires 223 of the linear part 211 of the coil and a wire 224a in the first line and the first tier of the wires 224 of the coil end 212. Also, the junction 204 includes a junction 204b between a wire in the first line and the second tier of the wires 223 of the linear part 211 of the coil and a wire in the first line and the second tier of the wires 224 of the coil end 212.

The junction 204 includes a junction 204c between a wire in the second line and the first tier of the wires 223 of the linear part 211 of the coil and a wire in the second line and the first tier of the wires 224 of the coil end 212. The junction 204 includes a junction 204d between a wire in the second line and the second tier of the wires 223 of the linear part 211 of the coil and a wire in the second line and the second tier of the wires 224 of the coil end 212.

In FIG. 15, the wires joined via the junction 204a and the wires joined via the junction 204c in the first tier are shown in a dotted line so that the wires in the second tier are easy to see.

In the third embodiment, a position of a junction of certain wires and a position of a junction of wires adjacent to those wires differ from each other in the longitudinal direction.

When the above joined wires are the wire 223a in the first line and the first tier of the wires 223 of the linear part 211 of the coil and the wire 224a in the first line and the first tier of the wires 224 of the coil end 212, the junction of these wires is the junction 204a.

Also, the junctions of the wires adjacent to those wires are the junction 204b, the junction 204c, and the junction 204d. The position of the junction 204a, the position of the junction 204b, the position of the junction 204c, and the position of the junction 204d differ from one another in the longitudinal direction.

The effects of the third embodiment are described. In the configuration shown in FIG. 15, due to the swelling of the junction 204 between the wire of the linear part 211 of the coil and the wire of the coil end 212, a gap is created between these wires and the wires adjacent thereto. The present embodiment is configured so that the swelling of the junction of the wires adjacent to those wires is arranged in this gap. Therefore, the gap between the wires adjacent to each other can be reduced. Thereby, the swelling of the entire coil can be inhibited.

Namely, according to the third embodiment, it is possible to inhibit the swelling of the joint area between the wires of the linear part 211 of the coil and the wires of the coil end 212 and fit the coil into a predetermined size. This makes it easy to produce and store the rotating electrical machine coil. Also, in the third embodiment, a position of a junction of certain wires and a position of a junction of wires adjacent to those wires differ from each other in the longitudinal direction. This makes it possible to inhibit an increase of an electrical field between coils caused by the narrowing of a gap between adjacent coils. Accordingly, a rotating electrical machine with high reliability can be provided.

An insulation treatment to be performed around the junction may be simplified by, for example, omitting one of the adjacent junctions that is shifted in the longitudinal direction, or, in the case of winding an insulation tape around the junction, reducing the number of windings. At this time, since a wire insulator is originally provided on adjacent wires, insulation between wires is maintained.

Fourth Embodiment

Next, the fourth embodiment will be described. A description of the parts of each of the embodiments below that overlap those of the third embodiment is omitted.

FIG. 16 is a schematic diagram of an example of the joint between the linear part 211 of the coil and the coil end 212 of the fourth embodiment.

FIG. 16, like FIG. 15, schematically illustrates a configuration in which the linear part 211 of the coil and the coil end 212 are electrically joined by the junction 204 after separately forming the linear part 211 of the coil constituted by the wires 223 in two lines and eight tiers and the coil end 212 constituted by the wires 224 in two lines and eight tiers.

In the fourth embodiment, the wires 223 of the linear part 211 of the coil and the wires 224 of the coil end 212 are electrically joined by the junction 204. The wire of the linear part 211 of the coil in each line and each tier and the wire of the coil end 212 in each line and each tier are electrically connected to each other. In the example shown in FIG. 16, the number of wires 223 of the linear part 211 of the coil and the number of wires 224 of the coil end 212 that are joined by one junction 204 are both two. Since the periphery of each wire is insulated, the wires 223 of the linear part 211 of the coil that are joined by the same junction 204 are kept insulated from each other, and the wires 224 of the coil end 212 that are joined by the same junction 204 are kept insulated from each other.

In the example shown in FIG. 16, the junction 204 includes the junction 204a, the junction 204b, the junction 204c, and the junction 204d.

In the example shown in FIG. 16, the junction 204a is a junction of the wire 223a in the first line and the first tier of the wires 223 of the linear part 211 of the coil, the wire 223b in the first line and the second tier of the wires 223, the wire 224a in the first line and the first tier of the wires 224 of the coil end 212, and the wire 224b in the first line and the second tier of the wires 224.

Also, in the example shown in FIG. 16, the junction 204b is a junction of the wire in the first line and the third tier of the wires 223 of the linear part 211 of the coil, the wire in the first line and the fourth tier of the wires 223, the wire in the first line and the third tier of the wires 224 of the coil end 212, and the wire in the first line and the fourth tier of the wires 224.

In the example shown in FIG. 16, the junction 204c is a junction of the wire in the second line and the first tier of the wires 223 of the linear part 211 of the coil, the wire in the second line and the second tier of the wires 223, the wire in the second line and the first tier of the wires 224 of the coil end 212, and the wire in the second line and the second tier of the wires 224.

In the example shown in FIG. 16, the junction 204d is a junction of the wire in the second line and the third tier of the wires 223 of the linear part 211 of the coil, the wire in the second line and the fourth tier of the wires 223, the wire in the second line and the third tier of the wires 224 of the coil end 212, and the wire in the second line and the fourth tier of the wires 224.

In FIG. 16, the wires joined via the junction 204a and the wires joined via the junction 204c in the first tier are shown in a dotted line so that the wires in the third tier are easy to see.

In the fourth embodiment, a position of a junction of a certain block of wires and a position of a junction of a block of wires adjacent to this block of wires, when defining wires in a plurality of tiers in a line as a block of wires, differ from each other in the longitudinal direction.

In the fourth embodiment, a block of wires formed of the wire 223a in the first line and the first tier of the wires 223 of the linear part 211 of the coil and the wire 223b in the first line and the second tier of the wires 223 of the linear part 211 of the coil described above is defined as a block of wires of the linear part 211 of the coil. Also, in the fourth embodiment, a block of wires formed of the wire 224a in the first line and the first tier of the wires 224 of the coil end 212 and the wire 224b in the first line and the second tier of the wires 224 of the coil end 212 is defined as a block of wires of the coil end 212. At this time, the junction of these blocks of wires is the junction 204a.

Also, the junctions of the blocks of wires adjacent to those blocks of wires are the junction 204b, the junction 204c, and the junction 204d. The position of the junction 204a, the position of the junction 204b, the position of the junction 204c, and the position of the junction 204d differ from one another in the longitudinal direction.

The number of wires of the linear part 211 of the coil and the number of wires of the coil end 212 that are joined together are not limited to two, and may be any number, such as three, respectively, as long as the number of wires of the linear part 211 of the coil and the number of wires of the coil end 212 are the same and a plurality.

The effects of the fourth embodiment are described. In the fourth embodiment, a block of wires made of a plurality of wires of the linear part 211 of the coil and a block of wires made of a plurality of wires of the coil end 212 are joined by one junction, in addition to the effects described in the third embodiment. Thereby, the number of junctions can be reduced, as compared to the third embodiment, under the same conditions of the number of lines and the number of tiers of the wires of the entire coil. Therefore, the swelling of the entire coil can be further inhibited, as compared to the third embodiment.

Fifth Embodiment

Next, the fifth embodiment will be described.

FIG. 17 is a schematic diagram of an example of the joint between the linear part 211 of the coil and the coil end 212 of the fifth embodiment.

FIG. 17 schematically illustrates a configuration in which the wires 223 of the linear part 211 of the coil and the wires 224 of the coil end 212 are electrically joined by the junction 204 after separately forming the linear part 211 of the coil constituted by the wires 223 in two lines and eight tiers, and the coil end 212 constituted by the wires 224 in two lines and four tiers. In this embodiment, the size of a wire 224 of the coil end 212 is set to a size equivalent to two wires 223 of the linear part 211 of the coil.

Most portions of the wires of the linear part 211 of the coil are stored in an iron core. As such, an amount of flux linkage of the linear part 211 of the coil is larger than that of the coil end 212, increasing an eddy-current loss. Therefore, the wires of the linear part 211 of the coil are preferably made of wires that are thinner than the wires of the coil end 212. In the fifth embodiment, the linear part 211 of the coil and the coil end 212 are separately produced. Therefore, the number of tiers of the wires of each of them can be made different.

In the fifth embodiment, the wires 223 of the linear part 211 of the coil and the wires 224 of the coil end 212 are electrically joined by the junction 204. The wires of the linear part 211 of the coil in each line and each tier and the wires of the coil end 212 in each line and each tier are electrically connected to each other. In the example shown in FIG. 17, the number of wires 223 of the linear part 211 of the coil that are joined by one junction 204 is two, and the number of wires 224 of the coil end 212 that are joined by one junction 204 is one.

In the example shown in FIG. 17, the junction 204 includes the junction 204a, the junction 204b, the junction 204c, and the junction 204d.

In the example shown in FIG. 17, the junction 204a is a junction of the wire 223a in the first line and the first tier of the wires 223 of the linear part 211 of the coil, the wire in the first line and the second tier of the wires 223, and the wire 224a in the first line and the first tier of the wires 224 of the coil end 212.

Also, in the example shown in FIG. 17, the junction 204b is a junction of the wire in the first line and the third tier of the wires 223 of the linear part 211 of the coil, the wire in the first line and the fourth tier of the wires 223, and the wire in the first line and the second tier of the wires 224 of the coil end 212.

In the example shown in FIG. 17, the junction 204c is a junction of the wire in the second line and the first tier of the wires 223 of the linear part 211 of the coil, the wire in the second line and the second tier of the wires 223, and the wire in the second line and the first tier of the wires 224 of the coil end 212.

In the example shown in FIG. 17, the junction 204d is a junction of the wire in the second line and the third tier of the wires 223 of the linear part 211 of the coil, the wire in the second line and the fourth tier of the wires 223, and the wire in the second line and the second tier of the wires 224 of the coil end 212.

In FIG. 17, the wires joined via the junction 204a and the wires joined via the junction 204c are shown as a dotted line so that the wire of the linear part 211 of the coil in the third tier and the wire of the coil end 212 in the second tier are easy to see.

In the fifth embodiment, a position of a junction of a wire block and a position of a junction of a wire block adjacent to this wire block, when defining a wire(s) in one tier or a plurality of tiers in a line as a wire block, differ from each other in the longitudinal direction.

In the example shown in FIG. 17, a block of wires formed of the wire 223a in the first line and the first tier of the wires 223 of the linear part 211 of the coil and the wire in the first line and the second tier of the wires 223 of the linear part 211 of the coil described above is defined as a block of wires of the linear part 211 of the coil. Also, in the example shown in FIG. 17, a wire block formed of the wire 224a in the first line and the first tier of the wires 224 of the coil end 212 is defined as a wire block of the coil end 212. At this time, the junction of these wire blocks is the junction 204a.

Also, the junctions of the wire blocks adjacent to those wire blocks are the junction 204b, the junction 204c, and the junction 204d. The position of the junction 204a, the position of the junction 204b, the position of the junction 204c, and the position of the junction 204d differ from one another in the longitudinal direction.

The ratio between the number of wires of the linear part 211 of the coil and the number of wires of the coil end 212 that are joined together are not limited to 2:1. The ratio between the number of wires of the linear part 211 of the coil and the number of wires of the coil end 212 may be 3:1 or 3:2, for example, as long as the ratio indicates that the number of wires of the linear part 211 of the coil is greater than the number of wires of the coil end 212.

The effects of the fifth embodiment are described. In the fifth embodiment, the wires of the linear part 211 of the coil that are joined by the same junction 204 are made of wires that are thinner than the wires of the coil end 212, in addition to the effects of the third embodiment. Thereby, an eddy-current loss that occurs in the coil can be reduced. Also, since it is unnecessary to arrange the number of wires of the linear part 211 of the coil and the number of wires of the coil end 212 to be the same when joining the linear part 211 of the coil and the coil end 212, a tolerance in production of the coil increases.

Sixth Embodiment

Next, the sixth embodiment will be described.

Figure 18:
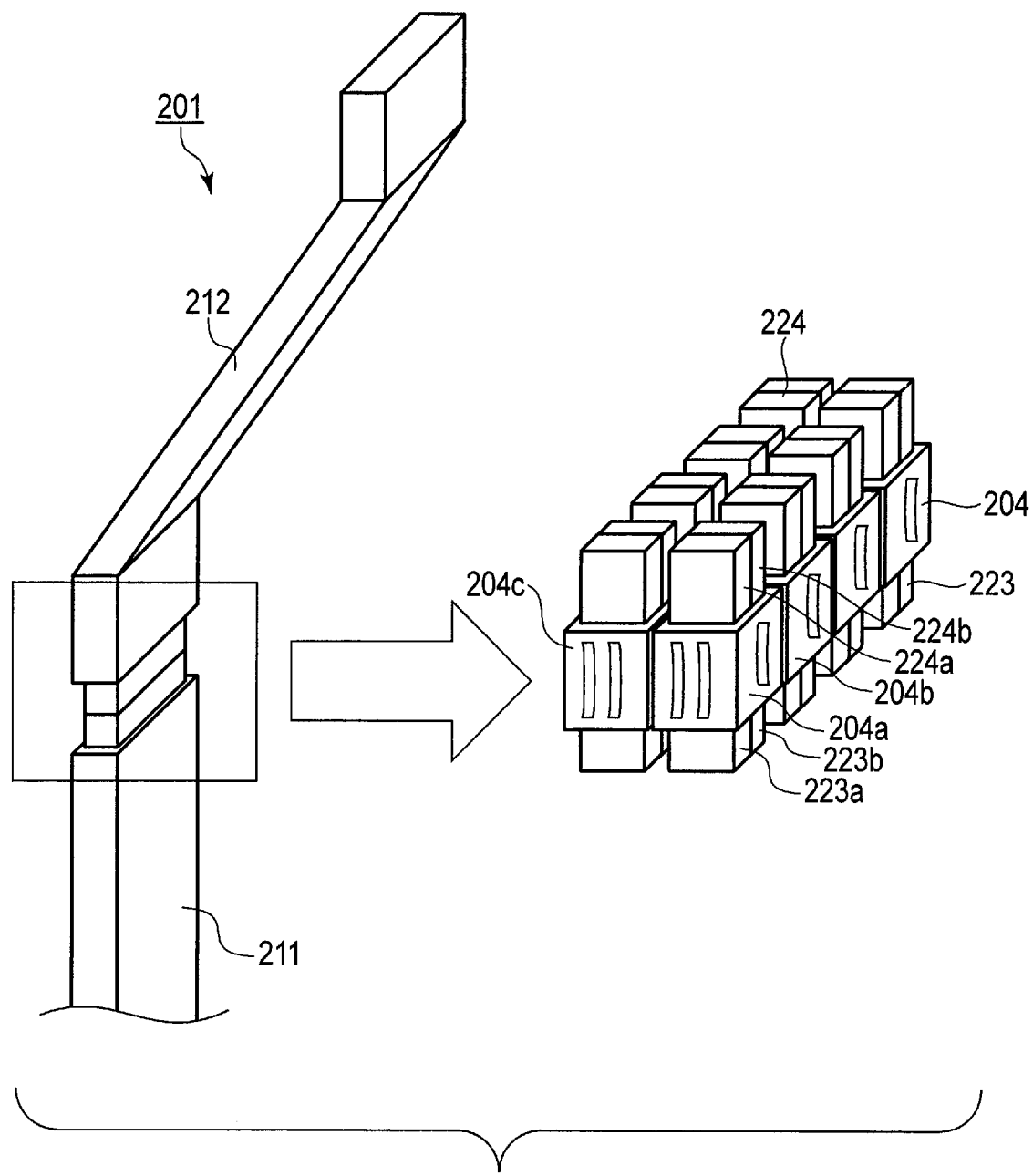
FIG. 18 is a schematic diagram of an example of a joint between a linear part of a coil and a coil end of a sixth embodiment.

FIG. 18 is a schematic diagram of an example of the joint between the linear part 211 of the coil and the coil end 212 of the sixth embodiment.

FIG. 18 schematically illustrates a configuration in which, after separately forming the linear part 211 of the coil constituted by the wires 223 in two lines and eight tiers and the coil end 212 constituted by the wires 224 in two lines and eight tiers, two wires of the linear part 211 of the coil and two wires of the coil end 212 are electrically joined by one junction 204, and wire conductors of these connected wires are electrically connected to each other.

In the example shown in FIG. 18, the number of wires 223 of the linear part 211 of the coil and the number of wires 224 of the coil end 212 that are electrically joined by the same junction 204 are both two.

The above number of wires may be any number as long as it is a plurality: for example, the number of wires 223 of the linear part 211 of the coil may be three and the number of wires 224 of the coil end 212 may be two.

In the example shown in FIG. 18, the junction 204 includes the junction 204a, the junction 204b, and the junction 204c. The junction 204a is a junction of the wire 223a in the first line and the first tier of the wires 223 of the linear part 211 of the coil, the wire 223b in the first line and the second tier of the wires 223, the wire 224a in the first line and the first tier of the wires 224 of the coil end 212, and the wire 224b in the first line and the second tier of the wires 224.

Also, the junction 204b is a junction of the wire in the first line and the third tier of the wires 223 of the linear part 211 of the coil, the wire in the first line and the fourth tier of the wires 223, the wire in the first line and the third tier of the wires 224 of the coil end 212, and the wire in the first line and the fourth tier of the wires 224.

The junction 204c is a junction of the wire in the second line and the first tier of the wires 223 of the linear part 211 of the coil, the wire in the second line and the second tier of the wires 223, the wire in the second line and the first tier of the wires 224 of the coil end 212, and the wire in the second line and the second tier of the wires 224.

As compared to the case where the number of wires 223 of the linear part 211 of the coil and the number of wires 224 of the coil end 212 are both one, the area of the swelling by the junction 204 is reduced to an amount equivalent to four tiers, which is half of the eight tiers as the number of tiers of the wires.

In the sixth embodiment, a plurality of wires of the linear part 211 of the coil and a plurality of wires of the coil end 212 are joined by one junction. Thereby, the number of junctions can be reduced under the same conditions of the number of lines and the number of tiers of the wires of the entire coil, as compared to the case where one wire of the linear part 211 of the coil and one wire of the coil end 212 are joined by the junction, and therefore the swelling of the entire coil can be inhibited. Accordingly, the coil can be configured to have a predetermined size or less, and the rotating electrical machine coil can be easily produced and stored.

Seventh Embodiment

The seventh embodiment will be described.

Figure 19:
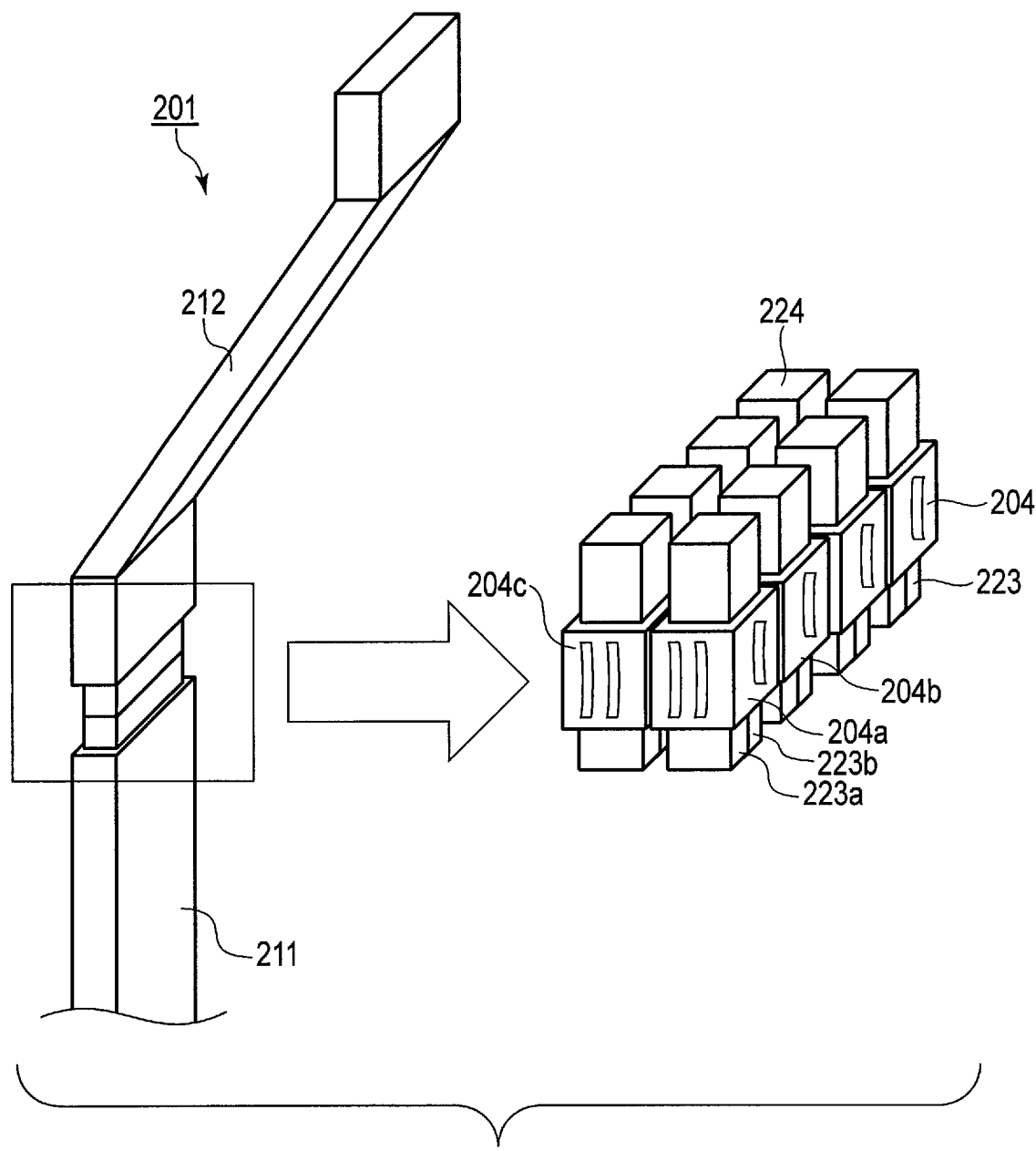
FIG. 19 is a schematic diagram of an example of a joint between a linear part of a coil and a coil end of a seventh embodiment.

FIG. 19 is a schematic diagram of an example of the joint between the linear part 211 of the coil and the coil end 212 of the seventh embodiment.

FIG. 19 schematically illustrates the junction 204 where the linear part 211 of the coil and the coil end 212 are electrically joined after separately forming the linear part 211 of the coil constituted by the wires 223 in two lines and eight tiers and the coil end 212 constituted by the wires 224 in two lines and four tiers.

Most portions of the wires of the linear part 211 of the coil are stored in an iron core. As such, an amount of flux linkage of the linear part 211 of the coil is larger than that of the coil end 212, increasing an eddy-current loss. Therefore, the wires of the linear part 211 of the coil are preferably made of wires that are thinner than the wires of the coil end 212. In the seventh embodiment, since the linear part 211 of the coil and the coil end 212 are separately produced, the number of tiers of the wires of each of them can be made to be different.

In the seventh embodiment, the wires 223 of the linear part 211 of the coil and the wires 224 of the coil end 212 are joined by one junction. In the example shown in FIG. 19, the number of wires 223 of the linear part 211 of the coil that are joined by the same junction 204 is two, and the number of wires 224 of the coil end 212 is one.

In the example shown in FIG. 19, the junction 204 includes the junction 204a, the junction 204b, and the junction 204c. The junction 204a is a junction of the wire 223a in the first line and the first tier of the wires 223 of the linear part 211 of the coil, the wire in the first line and the second tier of the wires 223, and the wire 224a in the first line and the first tier of the wires 224 of the coil end 212.

In the example shown in FIG. 19, the junction 204b is a junction of the wire in the first line and the third tier of the wires 223 of the linear part 211 of the coil, the wire in the first line and the fourth tier of the wires 223, and the wire in the first line and the second tier of the wires 224 of the coil end 212.

In the example shown in FIG. 19, the junction 204c is a junction of the wire in the second line and the first tier of the wires 223 of the linear part 211 of the coil, the wire in the second line and the second tier of the wires 223, and the wire in the second line and the first tier of the wires 224 of the coil end 212.

The ratio between the number of wires of the linear part 211 of the coil and the number of wires of the coil end 212 that are joined together are not limited to 2:1, and may be 3:1 or 3:2, for example, as long as the number of wires of the linear part 211 of the coil is greater than the number of wires of the coil end 212.

The effects of the seventh embodiment are described. In the seventh embodiment, the wires of the linear part 211 of the coil that are joined by the same junction 204 are made of wires that are thinner than the wires of the coil end 212, in addition to the effects of the sixth embodiment. Therefore, an eddy-current loss that occurs in the coil can be reduced. Also, since it is unnecessary to arrange the number of wires of the linear part 211 of the coil and the number of wires of the coil end 212 to be the same when joining the linear part 211 of the coil and the coil end 212, tolerances in production of the coil increase.

While several embodiments have been described, these embodiments have been presented by way of example only, and are not intended to limit the scope of the invention. Indeed, the novel embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the invention.

The invention claimed is:

1. A rotating electrical machine coil with a conductor and an insulation layer that is provided around the conductor to cover the conductor, the rotating electrical machine coil comprising:
- a linear part of the coil: and
- a coil end that is separable from and electrically connectable to the linear part of the coil:
- wherein the coil end is electrically connectable with the linear part of the coil via an adapter having electrical conductivity; and
- wherein a field alleviating layer is provided in a field convergence portion in at least one of a connection portion between the linear part of the coil and one end of the adapter or an electrical connection portion between the coil end and another end of the adapter.

* * * * *